(No Model.)

C. M. ELKINS & W. H. WESTON.
SAW SHARPENING MACHINE.

No. 263,495. Patented Aug. 29, 1882.

WITNESSES:
Donn Twitchell
C. Sedgwick

INVENTOR:
C. M. Elkins
W. H. Weston
BY Munn & Co
ATTORNEYS.

UNITED STATES PATENT OFFICE.

CHARLES M. ELKINS, OF MATTEAWAN, AND WILBUR H. WESTON, OF NEWBURG, NEW YORK.

SAW-SHARPENING MACHINE.

SPECIFICATION forming part of Letters Patent No. 263,495, dated August 29, 1882.

Application filed December 28, 1881. (No model.)

*To all whom it may concern:*

Be it known that we, CHARLES M. ELKINS, of Matteawan, in the county of Dutchess and State of New York, and WILBUR H. WESTON, of Newburg, in the county of Orange and State of New York, have invented a new and Improved Saw-Filing Implement, of which the following, is a full, clear, and exact description.

The object of our invention is to provide a device by means of which unskilled as well as skilled persons may file a saw properly and with little trouble.

The device is adapted to be attached to a bench or other stationary object, and is composed mainly of two jaws for clamping the blade of the saw, and of a longitudinally-sliding and laterally traveling or movable handle for holding and operating the file, which handle is axially adjustable for giving the proper stand to the file and is pivoted so that it may be adjusted horizontally for filing both sides of the teeth of the saw, graduations being provided for setting the handle so that both sides of the teeth may be beveled alike. The rod on which the handle moves or travels is held parallel with the jaws in suitable supports or arms which are vertically and laterally movable and adjustable for giving the file any desired vertical inclination with respect to the teeth of the saw and for removing and replacing the rod, and the device will be provided with a plain rod for the file-handle to slide upon, and also with a separate screw-rod and attached handle, which rods will be interchangeable, the latter being intended for use when great accuracy in the movement of the handle is desired.

Reference is to be had to the accompanying drawings, forming part of this specification, in which similar letters of reference indicate corresponding parts in all the figures.

Figure 1:
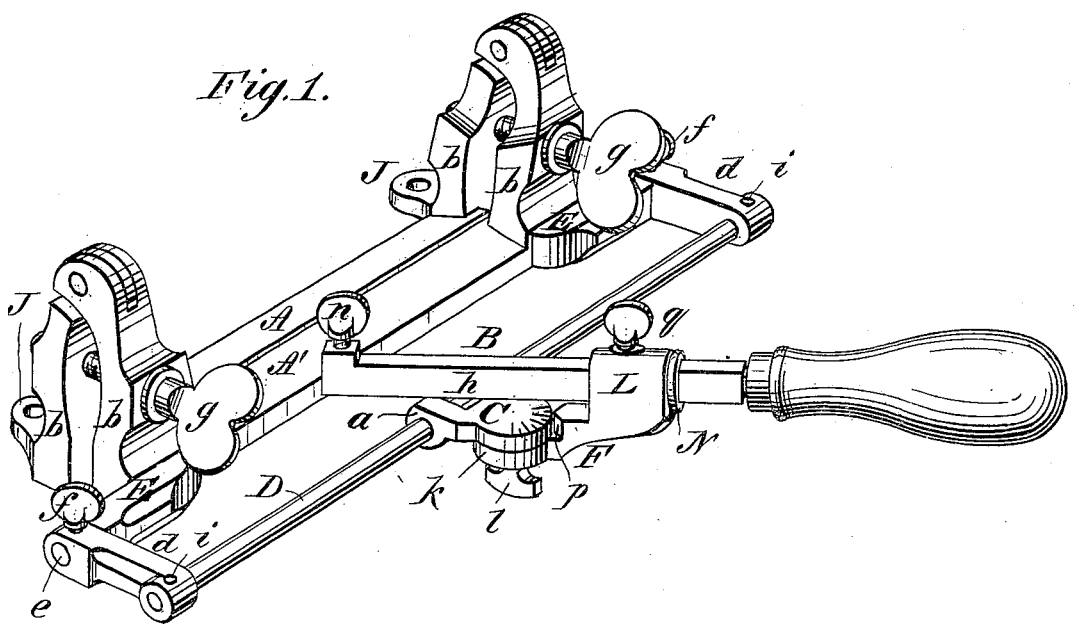
Figure 3:
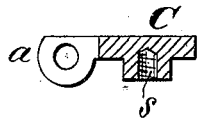
Figure 2:
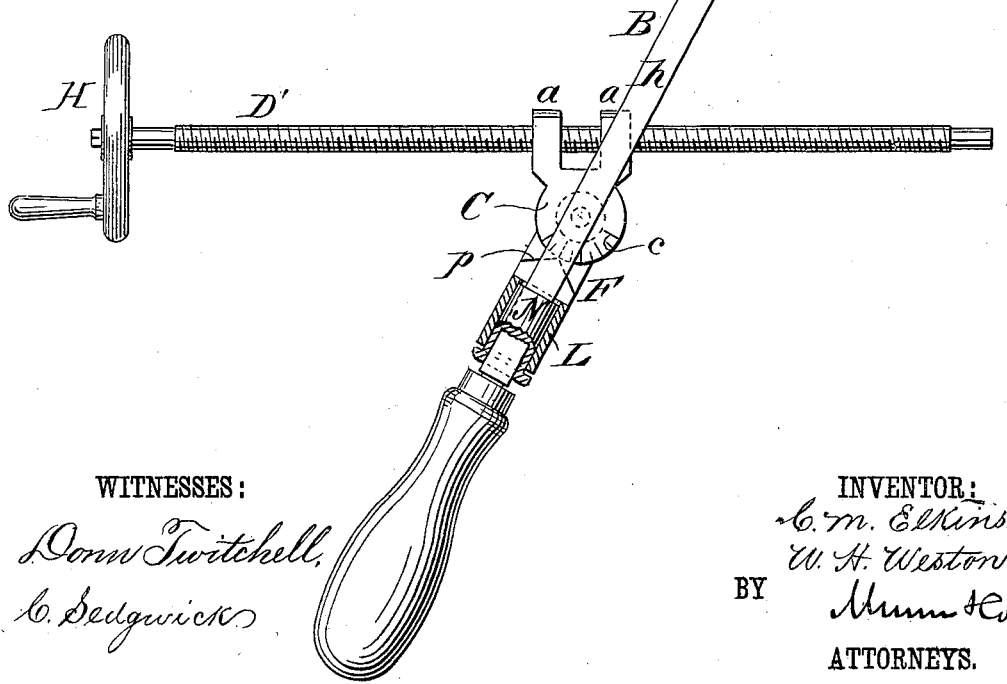

Figure 1 is a perspective view of our new and improved filing device or implement. Fig. 2 is a perspective view, partly in section, of the screw-rod and attached handle; and Fig. 3 is a sectional elevation of the traveling plate to which the file-handle is pivoted.

A A' represent the jaws; B represents the handle, and C represents the traveling plate to which the handle is attached, which is formed with the sleeves *a a*, which fit upon the rods D D', as clearly shown in Figs. 1 and 2. The jaws A A' are hinged together by means of the upwardly projecting arms *b b*, and are adapted to be clamped together for holding the blade of a saw by the thumb-screws *g g*, which pass through the arms, as shown. The rods D D' are adapted to be held parallel with the jaws in the arms or supports *d d*, which are placed upon the gudgeons *e e*, formed on the projections E E of the jaw A', and the outer ends of these arms are adapted to be raised or lowered and fastened by means of the set-screws *f f*, for changing the position of the file-handle relatively to the jaws and the blade of the saw; and they are also adapted to be removed from or drawn outward upon the gudgeons for changing the rods D D' one for the other, when desired. The rods are held in place in the arms or supports by the pins *i i*, as shown in Fig. 1; or set-screws may be used for this purpose, if desired. The handle B is formed with the long square shank *h*, and is held and pivoted to the traveling plate C by the bracket F, which is formed at its lower end with the circular plate *k*, through which the thumb-screw *l* passes, which screw enters the threaded socket *s* of the traveling plate and holds the bracket securely and permits its adjustment, and at its outer end the bracket is formed with the sleeve L. This sleeve has a circular opening through it, and this opening is provided with the loose bushing N, which has a square opening through it, through which the shank *h* of the handle passes, as shown clearly in Fig. 2. This bushing is adapted to be turned in the sleeve, and is adapted to be held at any desired position by the set-screw *q*, for holding the handle at any desired axial position for bringing the cutting-surface of the file (which is to be placed in the end of the handle) to suit the slant of the saw-teeth. The end of the handle is centrally bored, as shown in dotted lines in Fig. 2, to receive the tang of the file, and the set-screw *n* is provided for holding the file.

In use the blade of the saw is to be clamped between the jaws A A', and the file is to be secured in the handle and the handle set by the thumb-screw $l$ to suit the file to the bevel of the saw-teeth, and by the thumb-screw $q$ to suit the slant or angle of the teeth. The handle is then to be forced backward and forward through the bushing N until all of the teeth are filed upon one side, the handle being moved along upon the rod as the teeth are successively finished.

Upon the upper side of the traveling plate C are formed the graduations $c$, and the forward part of the bracket F is formed with the point $p$, so that when the teeth of the saw are filed upon one side before the handle is set for filing the other side of the teeth the mark indicated by the point should be observed. The handle is then to be turned upon its pivot until the point reaches the corresponding mark upon the opposite side of the traveling plate and set by the screw $l$, and the teeth filed as before.

If found necessary, the longitudinal inclination of the handle may be changed by adjusting the arms $d\ d$, which may be easily done by means of the thumb-screws $f\ f$, which impinge upon the gudgeons $e\ e$ and hold the arms in any desired position.

If the plain rod D is used, the handle will be moved from tooth to tooth by simply sliding the traveling plate along the rod, which will be done by the hands of the operator without any special guide as to the proper distance of movement. For ordinary saws such guide will not be needed; but in case great accuracy is desired in the size and shape of the teeth the plain rod D will be removed by sliding one of the arms $d$ upon its gudgeon and the screw-rod D' put in its place. In this form of rod the sleeves $a\ a$ will be threaded to receive the threads of the rod D', and one end of the screw-rod will be provided with the crank-wheel H, by which the rod can be turned for moving the traveling plate and the handle. By means of this screw-rod the file and handle may be set with great accuracy, so that all of the teeth of the saw will have a uniform width.

It will be understood that the length of the jaws may be the length of an ordinary saw-blade, or they may be much shorter. In the former case the saw need not be moved, after being once properly clamped, until all of the teeth are sharpened; but in the latter case the teeth will have to be sharpened in sections, the saw being moved along between the jaws as each section is finished.

It will be noticed that the upper surface of the jaws A A' are beveled or inclined from the point of contact with the saw-blade outward and downward, so that they will not interfere with any desired longitudinal inclination of the file and file-handle.

By means of this implement or device the file, after having been once set in the proper position relatively to the teeth of the saw, will maintain that position, so that each tooth of the saw will invariably be filed alike, thus rendering the proper filing of the saw a simple and easy task, which may be accomplished by an unskilled as well as by a skilled person.

The device is provided with the lugs J J, formed integral with the jaw A, for attaching the device by means of set-screws to a bench or other similar stationary object for use; or any other suitable means of attachment may be used.

Spiral metal springs, or, preferably, pieces of rubber, will be placed upon the clamping-screws $g\ g$ between the arms $b\ b$ of the jaws for throwing the jaws apart when the screws are turned to open the jaws, and for preventing all danger of dulling the saw from contact with the screws in case the saw is carelessly forced upward between the jaws; and, instead of using the thumb-screws $f\ f$ for holding the arms $d\ d$ on the gudgeons, the gudgeons may be extended so as to protrude from the arms and the ends threaded to receive thumb-nuts, and the jaws may be covered with rubber, leather, or similar material to prevent all danger of injury to the blade of the saw from contact with the metal of the jaws.

Having thus described our invention, we claim as new and desire to secure by Letters Patent—

1. The combination, with a handle having shank $h$ and a plate, C, having sleeves $a$ for the rod D, of the bracket F, having circular plate $k$, sleeve L, and threaded socket $s$, the thumb-screw $l$, the loose bushing N, and the set-screw $q$, as and for the purpose specified.

2. The combination, with the saw-holding jaws, of the arms $d\ d$, the jaw-projections E, having gudgeons $e$, and the set-screws $f$, whereby the rods D D' may be readily interchanged and the relation of the file-handle to the saw-blade regulated, as described.

CHARLES M. ELKINS.
WILBUR H. WESTON.

Witnesses:
M. HAZARD LASHER,
FRANK ROBINSON.